(12) United States Patent
Merckx et al.

(10) Patent No.: US 9,406,124 B2
(45) Date of Patent: Aug. 2, 2016

(54) METHOD OF ANALYZING AN IMAGE

(71) Applicant: Agfa HealthCare NV, Mortsel (BE)

(72) Inventors: Gert Merckx, Mortsel (BE); Jeroen Cant, Mortsel (BE)

(73) Assignee: AGFA HEALTHCARE NV, Mortsel (BE)

( * ) Notice: Subject to any disclaimer, the term of this patent is extended or adjusted under 35 U.S.C. 154(b) by 0 days.

(21) Appl. No.: 14/424,489

(22) PCT Filed: Sep. 18, 2013

(86) PCT No.: PCT/EP2013/069324
§ 371 (c)(1),
(2) Date: Feb. 27, 2015

(87) PCT Pub. No.: WO2014/053317
PCT Pub. Date: Apr. 10, 2014

(65) Prior Publication Data
US 2015/0228072 A1   Aug. 13, 2015

Related U.S. Application Data

(60) Provisional application No. 61/733,439, filed on Dec. 5, 2012.

(30) Foreign Application Priority Data

Oct. 1, 2012 (EP) .................................. 12186753

(51) Int. Cl.
*G06T 7/00* (2006.01)
*G06T 5/00* (2006.01)

(52) U.S. Cl.
CPC ............... *G06T 7/0012* (2013.01); *G06T 5/005* (2013.01); *G06T 7/0081* (2013.01); *G06T 7/0093* (2013.01); *G06T 2207/10081* (2013.01); *G06T 2207/20016* (2013.01); *G06T 2207/20072* (2013.01); *G06T 2207/20081* (2013.01); *G06T 2207/20148* (2013.01); *G06T 2207/30008* (2013.01); *G06T 2207/30101* (2013.01)

(58) Field of Classification Search
None
See application file for complete search history.

(56) References Cited

U.S. PATENT DOCUMENTS

| 6,985,612 B2 | 1/2006 | Hahn |
| 2016/0093096 A1* | 3/2016 | Ouji .................... G06T 7/0081 382/131 |

OTHER PUBLICATIONS

Official Communication issued in International Patent Application No. PCT/EP2013/069324, mailed on Jan. 20, 2014.
Alyassin et al., "Semi-automatic bone removal technique from CT angiography data", Medical Imaging Proceedings of SPIE, vol. 4322, 2001, pp. 1273-1283.

(Continued)

*Primary Examiner* — Siamak Harandi
*Assistant Examiner* — Narek Zohrabyan
(74) *Attorney, Agent, or Firm* — Keating and Bennett, LLP

(57) ABSTRACT

An image is segmented by subjecting the image to an iterative thresholding operation, and a hierarchical representation of clusters is obtained by analyzing the results of each of the iterative thresholding steps to find clusters of adjacent image elements. A type class is assigned to a leaf cluster of the hierarchical representation and the assigned class is propagated towards the top of the hierarchical representation. Then a mask is generated marking the locations of image elements contained in the top ancestral clusters of a specific type.

10 Claims, 2 Drawing Sheets

(56) References Cited

OTHER PUBLICATIONS

Grau et al., "Improved Watershed Transform for Medical Image Segmentation Using Prior Information", IEEE Transactions on Medical Imaging, vol. 23, No. 4, Apr. 2004, pp. 447-458.

Hahn et al., "A Minimally-Interactive Watershed Algorithm Designed for Efficient CTA Bone Removal", Computer Vision Approaches to Medical Image Analysis, 2006, pp. 179-189.

Straka et al., "Bone Segmentation in CT-Angiography Data Using a Probabilistic Atlas", Proc, vol. 121, 2003, 8 pages.

Militzer et al., "Probabilistic Boosting Trees for Automatic Bone Removal from CT Angiography Images", Proc. of SPIE, vol. 7259, 2009, 8 pages.

Ma et al., "Hierarchical Segmentation Based on a Multilevel Thresholding", 2010 3rd International Congress on Image and Signal Processing (CISP2010), Oct. 16, 2010, pp. 1396-1400.

Fiebich et al., "Automatic Bone Segmentation Technique for CT Angiographic Studies", Journal of Computer Assisted Tomography, vol. 23, No. 1, Jan. 1, 1999, pp. 155-161.

* cited by examiner

METHOD OF ANALYZING AN IMAGE

CROSS-REFERENCE TO RELATED APPLICATIONS

This application is a 371 National Stage Application of PCT/EP2013/069324, filed Sep. 18, 2013. This application claims the benefit of U.S. Provisional Application No. 61/733,439, filed Dec. 5, 2012, which is incorporated by reference herein in its entirety. In addition, this application claims the benefit of European Application No. 12186753.5, filed Oct. 1, 2012, which is incorporated by reference herein in its entirety.

BACKGROUND OF THE INVENTION

1. Field of the Invention

The present invention relates to a method of analyzing an image represented by a digital image representation.

2. Description of the Related Art

In a radiocontrast medical imaging setting, a patient is administered a contrast agent to increase the radiodensity of some lumen in the body. In a reconstruction of angiographic X-ray projections, the vessel tree will therefore have a density similar to that of bony tissue. As such, when displaying only high intensity voxels of the volume, the radiologist is presented with an image containing only the vessel tree and bone. As bone might visually obstruct certain parts of the vessel tree, a significant speed-up of the diagnosis can be achieved by removing the skeletal structures from the view. This task can be broken up in a segmentation, and a classification task. During segmentation, the image data is broken up into regions that contain image elements likely to be of the same type (i.e. bone or vessel). Based on some quantitative or qualitative features of the regions, a classification scheme or user then determines if a particular region should be considered osseous or vascular tissue.

For smooth integration into the radiologist's workflow, bone removal algorithms should be designed with performance in mind. Whether devising an automated or semi-automated technique, a radiologist should not have to wait prohibitively long for an initial or manually corrected result.

Current approaches to bone removal include both interactive and automated approaches. Some interactive techniques include the work of Alyassin et al. (Alyassin, A. M., Avinash, G. B.: Semiautomatic bone removal technique from CT angiography data. Med Imaging, Proc. SPIE 4322 (2001) 1273-1283) in which interactively controlled global thresholds are used to separate the two tissue types. Notable automated methods include the ones by Grau, V., Mewes, A. U. J., Alcaniz, M., Kikinis, R., Warfield, S. K.: Improved watershed transform for medical image segmentation using prior information. IEEE Trans Med Imaging 23(4) (2004) 447-458 and H. Hahn, M. Wenzel, O. Konrad-Verse, and H. O. Peitgen, "A minimally-interactive watershed algorithm designed for efficient CTA bone removal," Computer Vision Approaches to Medical Image Analysis, pp. 178-189, 2006 who both used watershed transforms for segmentation. M. Fiebich, "Automatic bone segmentation technique for CT angiographic studies", J. Comput As, vol. 23, no. 1, p. 155, 1999 uses an iterative region growing approach, but has trouble in dealing with vessel calcifications. To increase robustness in an automated scheme, several authors need to use prior information Grau, and also M. Straka, A. LaCruz, M. Šramek, E. Groller, L. I. Dimitrov, and D. Fleischmann, "Bone segmentation in CT-angiography data using a probabilistic atlas," Proc. VMV 2003, vol. 121, 2003.

The watershed transform as used by Grau and Hahn is a powerful and commonly used segmentation tool. However, one pitfall of these (watershed methods), as stated in U.S. Pat. No. 6,985,612, is oversegmentation. The watershed techniques commonly generate too much basins, resulting in a high computational load during feature extraction and classification. There have been attempts to mitigate this, but the watershed transform remains a very costly operation on contemporary CTA (Computed Tomography Angiography) datasets. Therefore, the use of the watershed transform might be unwarranted when aiming for a fast algorithm. It has been noticed that in a vast majority of CTA studies, with the exception of head and neck studies, vascular and osseous tissue can reliably be separated by a simple thresholding operation. This can be explained by the fact that vessels visible in CTA studies are never anatomically fused to bone tissue; the high contrast lumen is always separated by soft tissue, in the very least by the vessel wall. It is due to partial volume effects and the limited resolution of CT modalities that they may appear to touch in CTA studies. Since the partial volume effect produces a voxel with intensity equal to a weighted average of the intensities of the different tissue types in that voxel, a threshold operation at the right intensity level is usually sufficient to separate bone and vascular components. Finding that right intensity level however, is not an easy task, which is why most existing approaches use interactively controlled threshold levels. The technique proposed here finds these levels automatically and then uses a trained classifier to determine the type of the segmented parts.

SUMMARY OF THE INVENTION

The above-mentioned aspects are realized by a method having the specific features set out below. Specific features for preferred embodiments of the invention are also set out below.

An analyzing method of a preferred embodiment of the present invention is applied to a digital image representation of image elements such as voxels in case of a 3D representation or pixels in case of a 2D representation.

The image is first segmented by subjecting its digital image representation to an iterative thresholding operation. The thresholding operation in most cases (but not necessarily) applies an increasing threshold. The thresholding operation is performed until a stopping criterion is reached.

In one preferred embodiment a stopping criterion is reached when no clusters are generated anymore (see below) that fulfill a minimum size requirement. In another preferred embodiment the stopping criterion is reached when said threshold reaches a given limit value.

By analyzing the results of each of said iterative thresholding steps clusters of adjacent image elements are computed. A hierarchical representation of the image is generated by establishing relations between the clusters of each of these steps. The clusters that have no relation with a cluster in the result of the next thresholding step (i.e. leaf clusters) are assigned a type class.

In one preferred embodiment a class to be assigned to a cluster is determined on the basis of the results of an analysis of values of qualitative and/or quantitative features determined for said cluster.

As will be explained further on, it is advantageous to decide upon a class to be assigned to a leaf cluster by a trained classifier.

Then, the assigned class(es) is/are propagated towards the top of said hierarchical representation following propagation rules. When a class can no longer be propagated according to the propagation rules, propagation along that branch of the hierarchy ends. A cluster that can no longer propagate its class upward is denoted as a top ancestral cluster.

Finally a mask is generated of image elements of a specific type as a union of the top ancestral clusters that were assigned the class of this type.

A method of a preferred embodiment of the present invention has been designed for application to bone segmentation of CTA volume data. In this application a first class is assigned to clusters of image elements of osseous tissue and a second class is assigned to clusters of image elements of vascular tissue.

However, other segmentation-classification applications may be envisaged such as object detection and machine vision.

In a specific preferred embodiment post processing is applied to add image elements to the mask such as post-processing to restore pixels that were lost during said thresholding operation.

Once the assignments have been performed, it is possible to remove a type of features from the image, e.g. to remove skeletal structures from a view.

A preferred embodiment of the present invention can be implemented as a computer program product adapted to carry out all aspects of the method of the present invention when run on a computer. A preferred embodiment of the present invention also comprises a computer readable medium comprising computer executable program code adapted to carry out the steps of the method of the present invention.

Further advantages and preferred embodiments of the present invention will become apparent from the following description and drawings.

DETAILED DESCRIPTION OF THE PREFERRED EMBODIMENTS

In this detailed description a preferred embodiment of the method of the present invention is explained with regard to the removal of bone tissue in a CTA image. CTA volume density is expressed in Hounsfield units.

Taking into consideration the computational complexity of thresholds with respect to that of watersheds, and the relative ease at which they can be parallelized, a threshold based segmenter is used in the proposed automated bone removal technique.

Figure 1:
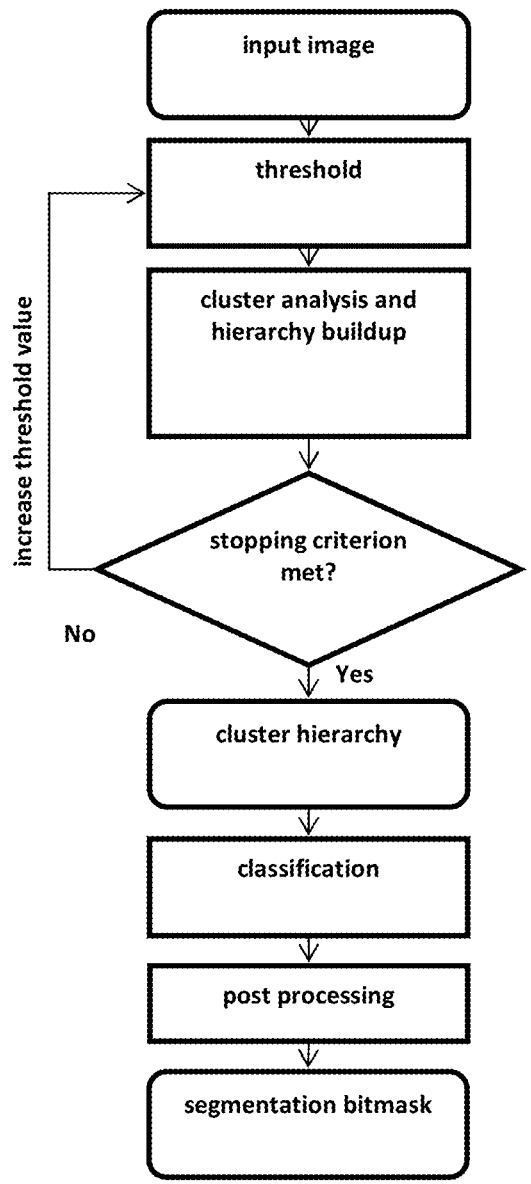
FIG. 1 shows a flowchart illustrating a preferred embodiment of the method of the present invention.
Figure 2:
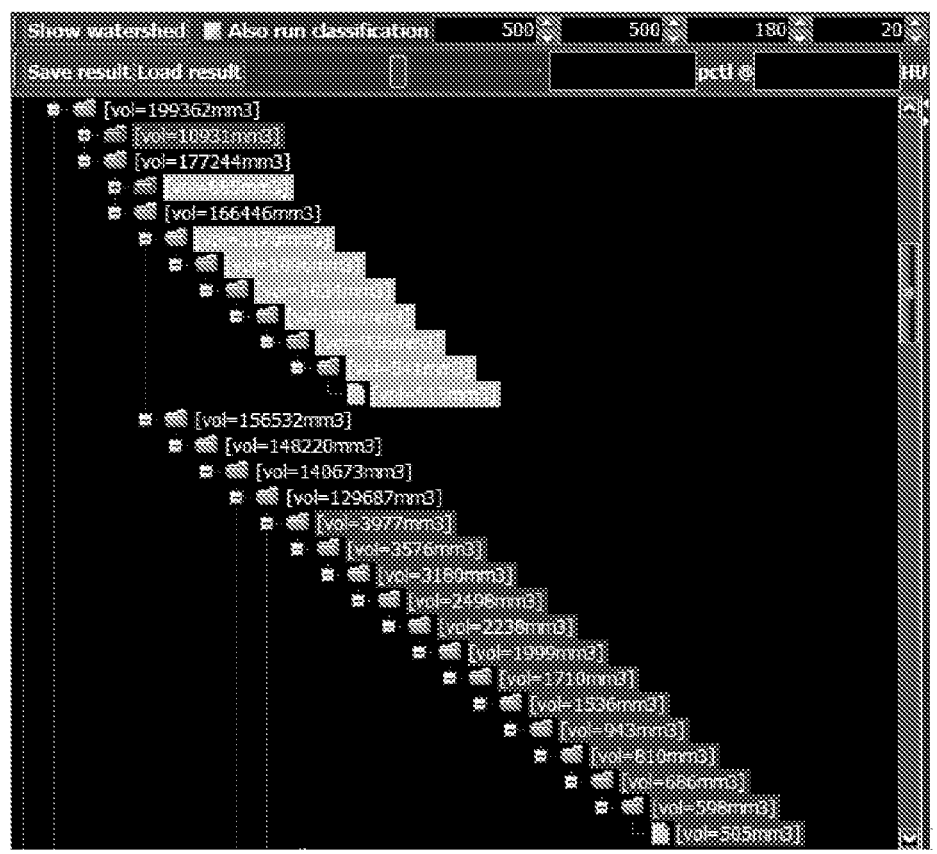
FIG. 2 shows a classified hierarchical breakdown of part of a volume.

A preferred method of the present invention is illustrated in FIG. 1. The method in general comprises a segmentation stage and a classifying step.

The segmentation stage includes an iterative process of thresholding and cluster analysis.
Iterative Thresholding:

The threshold operations are performed iteratively, with increasing threshold value each time: the mask of voxels that remain after each threshold operation is fed into the new threshold operation, at each stage reducing the computational cost as the number of voxels decreases. The masks rendered by each of the threshold operations are analyzed to find clusters of adjacent voxels. During this analysis, a number of qualitative features is calculated for each cluster.

A preferred method of the present invention starts with an initial threshold operation at 180 Hounsfield units. The output is a binary mask in which only the voxels with intensity higher than 180 HU are set to 1. Due to the sparsity of this mask, it is stored in memory as a run-length encoded mask. This first mask forms the input to the iterative process of cluster analysis and thresholding.
Cluster Analysis:

Clusters are defined as a group of voxels in which each voxel is adjacent to at least one of the other voxels in the group. At this stage adjacency is defined in the 6-neighborhood sense, but the cluster generator can be configured to use e.g. a 26-neighborhood of voxels.

Clusters are created by labelling runs in the run-length encoded mask. A run is labelled using an integer label and this label is propagated to all of its adjacent runs. This is achieved in a forward sweep followed by a pruning operation in which previously established corresponding labels are replaced by one unique label. One cluster is generated for each unique label in the mask. During analysis both intensity based features, such as variance, maximum value, average value, histogram data, and morphological features, such as volume, compactness, center of gravity, porosity, and principal components can be computed for each cluster. A cluster is therefore characterised by a combination of an integer label and a series of features computed on the voxels of runs carrying that label.

To reduce the number of clusters that need to be stored clusters smaller than 500 $mm^3$ are removed from the run-length mask before it is passed to the next threshold operation. The parameter that controls the increase of the threshold value between consecutive thresholds is in the described example set to 20 HU. By using the previous mask as input to the next threshold operation, the number of voxels that need to be visited during the threshold operation is reduced to the number of voxels in the mask.

The process of cluster generation and thresholding is continued until no clusters meet the minimum size requirement of 500 $m^3$ any more, or until a threshold level of 700 HU is reached. The algorithm can be configured to omit the minimum size requirement. This allows the cluster analysis step to be performed after the iterative thresholding.
Cluster Hierarchy:

Since in a preferred embodiment thresholding is performed with a monotonically increasing threshold value, clusters will fall apart into smaller clusters. This is exactly the envisioned effect to provide segmentation between bone and vascular regions. To trace these break-up events in the mask, relations need to be established between the clusters computed at successive threshold levels. The tracing of the break-up events allows assigning classes to clusters and propagating these to lower threshold clusters until a break-up event marks the joining of two distinct classes. Relationships between a higher and a lower threshold value mask are established by linking all clusters of the mask with the higher threshold value to the ones in the mask with a lower threshold value. For each cluster a direct 'ancestor' is established by taking an arbitrary voxel position of the cluster and looking up the label corresponding to this position in the lower threshold value mask. Each ancestor cluster maintains a list of its 'successor' clusters and each successor retains its direct ancestor.

Establishing hierarchy also enables to compute differential features describing the evolution of cluster features with respect to changing threshold levels.

Building the cluster hierarchy can also be performed incrementally as part of the cluster analysis step, as depicted in the flowchart of FIG. 1.

Classifier

To determine whether a computed cluster is part of osseous or vascular tissue the algorithm needs to be able to differentiate between these cluster classes based on their features. A learning algorithm can be used to train such a classifier based on manually labelled training data.

Classification

As mentioned earlier, some clusters are classified directly whereas others are assigned a class through propagation. Clusters are only classified directly if they have no successors any more. All other clusters in the hierarchy are ancestors of these 'leaves' and will be assigned a class based on propagation rules:

If all the successors of the cluster are of the same class, that cluster receives the same classification as its successors.

In all other cases the cluster receives the 'mixed' class attribute.

The highest clusters in the hierarchy (i.e. those generated on the lowest threshold level) that did not receive the mixed classification are the 'top ancestral clusters'.

The class propagation scheme is implemented recursively, ensuring clusters are visited only once during classification.

Each cluster also contains accumulators to keep track of the number of leafs each class has among its successors. This allows to, optionally, use a voting system: a direct classification of a leaf cluster can be overruled if there are sufficient indications that the direct classification was erroneous. As an example, consider a vessel tree in which one of the bifurcations is calcified. A calcification cluster has a higher probability of being misclassified since their characteristics are widely diverse and, as such, their features can be hard to discriminate of those of osseous clusters. Such single misclassification in a vessel tree is likely to be corrected by a voting mechanism that overrules a 10 to 1 minority.

The combination of the used segmentation and classification scheme yields several advantages with respect to watershed methods. Not only is the number of items that need to be classified several orders of magnitude smaller (typically $5.10^5$ versus 150 for a 512×512×770 dataset), which is good for performance reasons, but since the clusters typically have a larger extent and have a larger volume, the computed features are more robust to noise and down sampling the volume by reducing the number of slices. The described implementation is configured to down sample the volume on which the algorithm is performed, to slices with a minimal thickness of 2 mm.

The process of iterative thresholding in combination with a classifier trained to classify only the leaves of the cluster hierarchy also effectively solves the problem of the overlapping density values of trabecular bone and vessel tissue. Since the trabecular bone is typically first thresholded away, leaving only cortical bone, the classifier is never forced to label low density leaves as bone.

Training

The classifier used by the algorithm is a decision tree trained on a manually labelled training set of leaf clusters coming from a mixture of CT-scanners. The data was labelled by generating and visualizing the cluster hierarchy for each dataset. Selecting a cluster from the hierarchy would highlight the corresponding voxels in the CT scan. The selected cluster and all of its successors would then be labeled as a certain class by keystroke.

The labeled data is then fed into a learning algorithm that generates a decision tree using cross validation. To maintain generality the learner is forced to have at least 6 training instances per generated classifier leaf.

The learner is configured to discern the valuable from the useless cluster features and selects only the valuable features to train on. The cluster features the classifier is trained on are both features computed during the segmentation stage (cluster average, variance, maximum and skewness), and a differential feature named 'minimum relative volume' (MRV). The MRV of a cluster is the minimum of the volume ratios encountered when tracing from its root ancestral cluster to itself. In which the volume ratio is defined as the ratio between the volume of the direct ancestor, and the sum of the volumes of its direct successors. Calcifications and vascular clusters typically have a very low MRV, due to a sudden volume reduction above a certain threshold. The volumes of osseous clusters typically reduce much more slowly with respect to increasing threshold values, typically resulting in MRV values in the range 0.75 and 0.90.

Post-Processing

The output of a preferred embodiment of the method of the present invention so far consists of 26 run-length encoded masks (each corresponding to a threshold level) and a hierarchy of linked and classified clusters. A preliminary bone mask can be found by merging all the osseous 'top ancestral clusters'. A top ancestral cluster is a non-mixed class cluster at the highest possible level of the hierarchy. As such, top ancestral clusters are always located at the threshold level of a break-up event.

Since voxels are lost from the mask at each threshold operation, the top clusters do not include all voxels. These lost voxels can be added to the bone mask again by some form of post processing. The algorithm can be configured to use two methods: morphological dilation or distance transform-based assignment. During distance transform-based assignment, voxels present in the initial threshold mask, but not in the preliminary bone or vessel mask are assigned to a cluster based on their distance to the nearest bone or vascular cluster. The class of the voxel is determined by looking up the distance of the voxel to the bone mask and to the vessel mask. The voxel is assigned to the class with whom the distance is smallest. This is achieved by generating two distance transforms of the initial threshold mask using the vessel, and bone masks respectively as source volumes.

The resulting post-processed mask can then be visualized or removed from the volume.

Having described in detail preferred embodiments of the current invention, it will now be apparent to those skilled in the art that numerous modifications can be made therein without departing from the scope of the invention as defined in the appending claims.

The invention claimed is:

1. A method of analyzing an image represented by a digital image representation of image elements, the method comprising the steps of:
   segmenting the image by subjecting the digital image representation to an iterative thresholding operation until a stopping criterion is reached;
   finding clusters of adjacent voxels of the image elements by analyzing results of each iteration of the iterative thresholding operation;
   building a hierarchical representation of the image by establishing relations between the clusters found in the results of each iteration of the iterative thresholding operation;
   assigning a type class to a leaf cluster of the hierarchical representation;
   propagating the type class towards a top of the hierarchical representation using propagation rules; and generating a mask marking locations of the image elements of the type class by merging the locations of the image elements contained in the clusters that were assigned to the type class through propagation.

2. The method according to claim 1, wherein the mask marks the locations of the image elements that were contained in top ancestral clusters.

3. The method according to claim 1, wherein the stopping criterion is reached when no clusters that fulfill a minimum size requirement are generated anymore.

4. The method according to claim 1, wherein the stopping criterion is reached when a threshold is below a given limit value.

5. The method according to claim 1, wherein the type class to be assigned to one of the clusters is determined on a basis of results of an analysis of values of qualitative and/or quantitative features determined for the one of the clusters.

6. The method according to claim 1, wherein the type class to be assigned to the leaf cluster is determined by a trained classifier.

7. The method according to claim 1, wherein the method includes performing bone segmentation of computed tomography angiography (CTA) volume data, and a first class is assigned to the clusters of the image elements of osseous tissue and a second class is assigned to the clusters of the image elements of vascular tissue.

8. The method according to claim 1, further comprising performing a first type of post processing including adding image elements to the mask to restore pixels that were lost during the thresholding operation.

9. The method according to claim 8, wherein the first type of post processing operation includes a distance transform based assignment process.

10. A non-transitory computer readable medium comprising computer executable program code for carrying out, when the computer executable program is executed on a computer, the steps of the method of claim 1.

* * * * *